United States Patent [19]

Eberhardt

[11] 4,048,984
[45] Sept. 20, 1977

[54] OVEN RACK

[76] Inventor: Timothy J. Eberhardt, 3932 Dunnica, St. Louis, Mo. 63116

[21] Appl. No.: 674,565

[22] Filed: Apr. 7, 1976

[51] Int. Cl.² .................... F24C 15/16; A47J 37/00; A23L 3/00
[52] U.S. Cl. .................... 126/337 R; 126/41 C; 99/443 C; 198/793
[58] Field of Search .......... 126/337 A, 337 R, 273 R, 126/273 A, 332, 339, 41 C; 99/386, 443 C; 198/793, 802

[56] References Cited

U.S. PATENT DOCUMENTS

| 988,822 | 4/1911 | Rossin | 198/793 X |
|---|---|---|---|
| 1,939,914 | 12/1933 | Money | 126/337 R |
| 2,028,944 | 1/1936 | Morrison | 126/41 C |
| 2,038,028 | 4/1936 | DeMatteis | 99/386 |
| 2,225,991 | 12/1940 | Hobson | 126/337 R |
| 2,365,782 | 12/1944 | Stevenson | 198/793 |
| 2,657,301 | 10/1953 | Kincaid et al. | 198/793 X |
| 2,842,043 | 7/1958 | Reuland | 126/337 R |
| 2,941,655 | 6/1960 | Wells | 126/273 R |
| 3,012,554 | 12/1961 | Hirsch | 126/338 |
| 3,695,171 | 10/1972 | Hartley et al. | 99/443 C |

FOREIGN PATENT DOCUMENTS

| 1,363,267 | 4/1963 | France | 99/386 |
|---|---|---|---|
| 428,481 | 5/1935 | United Kingdom | 126/337 |

Primary Examiner—Edward G. Favors
Assistant Examiner—Larry Jones
Attorney, Agent, or Firm—Ralph W. Kalish

[57] ABSTRACT

An oven rack engageable with a chain for movement through a tunnel type oven comprising an open rectangular frame having a leading side, a trailing side, and outer and inner ends, there being a plurality of axially parallel spaced apart wire-like rods extending between said sides and being secured at their ends thereto defining a support for articles of food, or for vessels containing same; said frame being mounted upon runners, and a pin secured to said frame and engageable with the chain. A guide element is provided on the inner end of said frame for abutting the conveying chain to inhibit swinging of said rack during travel.

4 Claims, 6 Drawing Figures

OVEN RACK

BACKGROUND AND SUMMARY OF THE INVENTION

This invention relates in general to cooking equipment and, more particularly, to a rack adapted for conveyance through a tunnel type oven.

It is an object of the present invention to provide an oven rack for travel, as by means of an endless chain, through a tunnel-type oven which allows of maximum heat reception by articles of food supported upon said rack from heating elements presented within the floor of the oven.

It is a further object of the present invention to provide an oven rack of the character stated which is adapted for facile engagement with, and disengagement from, an endless chain so as to be useful within a system adapted for high volume cooking, such as particularly for fast food service and the like.

It is another object of the present invention to provide an oven rack incorporating a guide element for assuring the leading edge of the rack to be axially perpendicular to the attached chain whereby the article to be cooked will enter the oven for even cooking throughout.

It is a still further object of the present invention to provide an oven rack of the type stated which may be most economically manufactured; which is compact for storage in minimum space; and which is extremely durable and reliable in usage.

It is another object of the present invention to provide an oven rack adapted to present an incorporated grill spacedly above the particular heat source so that maximum heat may be received by the supported article without the same contacting such source, with resultant burning; and without contacting drippings or ash accumulating below such rack during cooking.

DESCRIPTION OF THE PREFERRED EMBODIMENT

Figure 1:
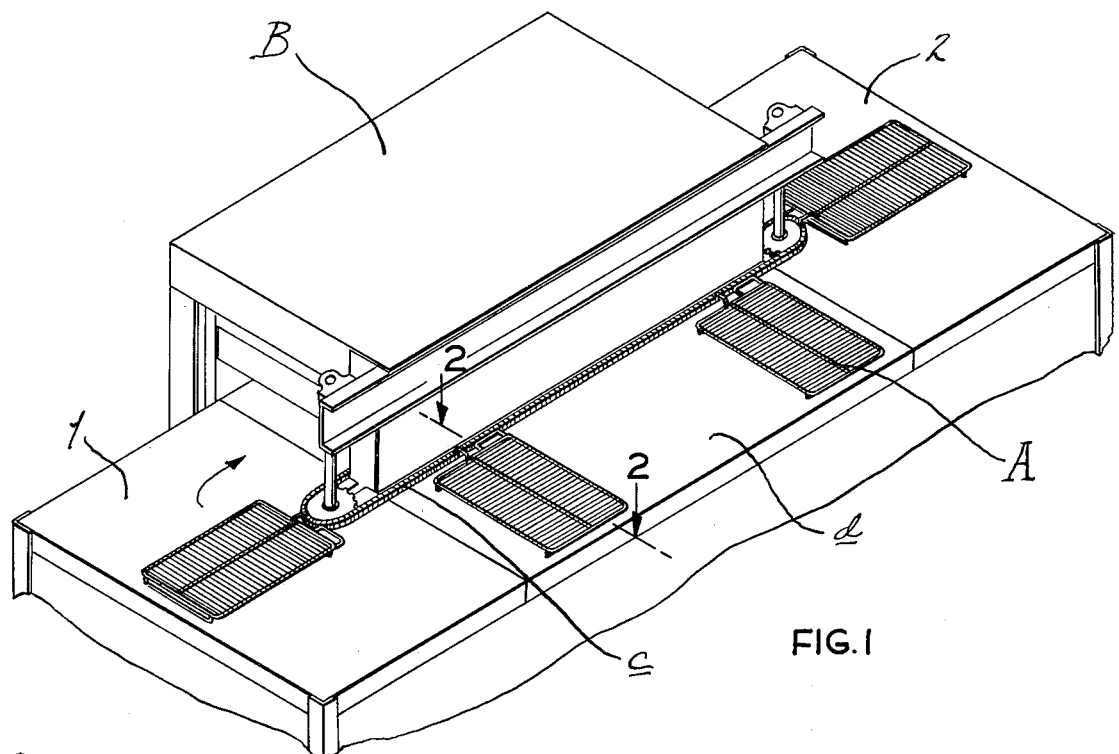
FIG. 1 is a perspective view of an oven rack constructed in accordance with and embodying the present invention illustrating same as engaged upon a conveyor chain associated with a tunnel type oven.
Figure 2:
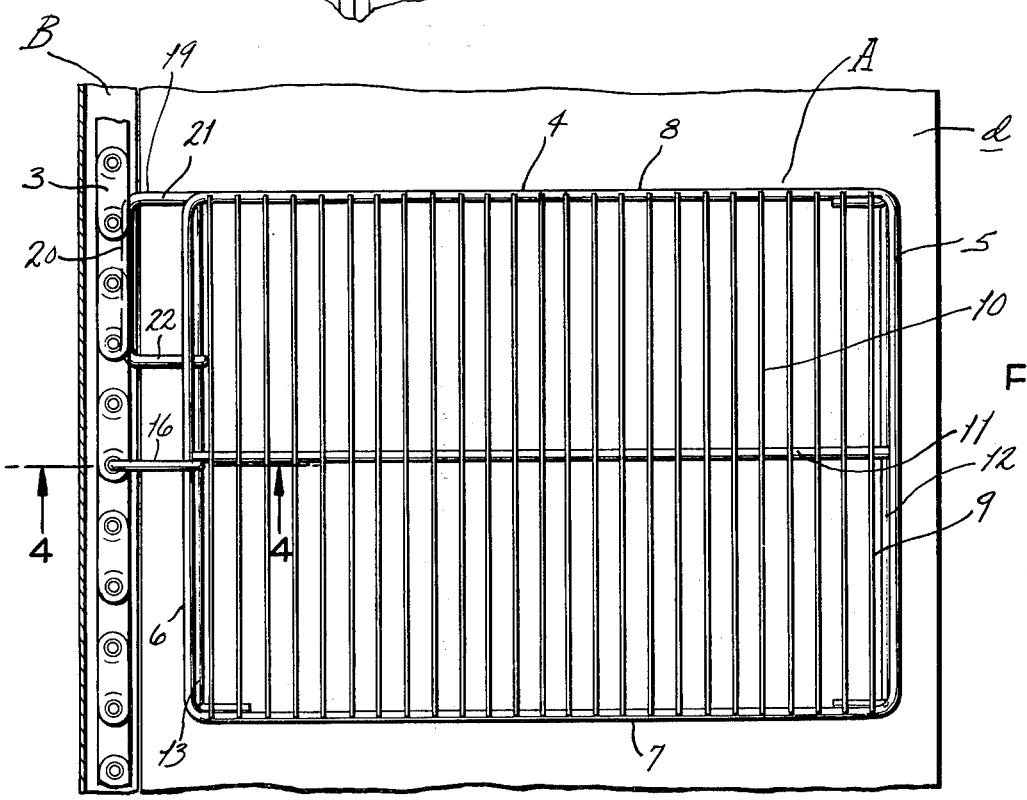
FIG. 2 is a top plan view as viewed along line 2—2 of FIG. 1.
Figure 3:
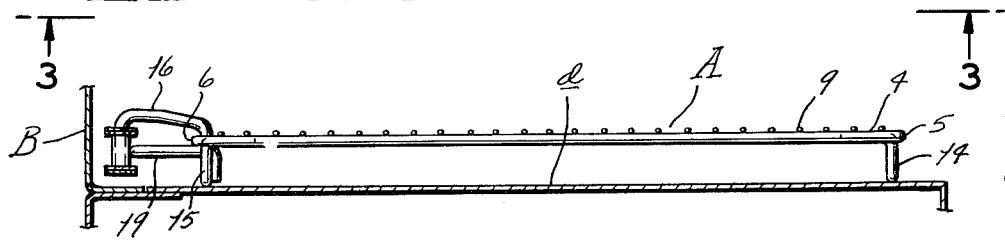
FIG. 3 is an end view taken on the line 3—3 of FIG. 2.
Figure 4:
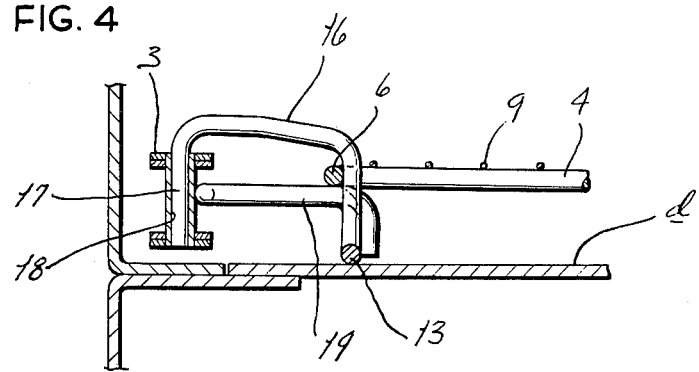
FIG. 4 is a horizontal transverse sectional view taken on the line 4—4 of FIG. 2.
Figure 5:
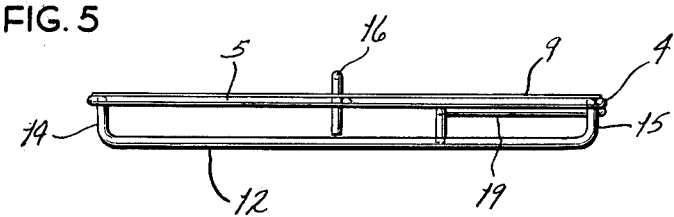
FIG. 5 is an end view of the rack as taken on the right hand side of FIG. 2.
Figure 6:
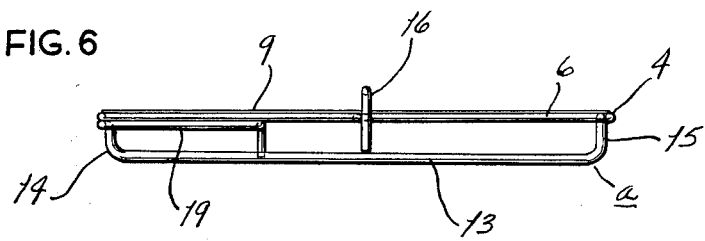
FIG. 6 is an end view of the rack as taken from the left hand side of FIG. 2.

Referring now by reference characters to the drawings which illustrate the preferred embodiment of the present invention, A designates an oven rack for utilization with a tunnel type oven B (FIG. 1) having a serving deck $d$ adjacent thereto with continuous terminal portions 1,2 at the ingress and egress ends of oven B, respectively. An endless chain $c$ comprised of a multiplicity of articulated links 3 is provided for conveying rack A through oven B; said chain $c$ being driven by suitable expedients. Oven B with its associated components does not form a part of the present invention but is illustrated and briefly described in order to depict the environment in which the present invention operates.

Oven rack A comprises a preferably rectangular frame 4, as of small diameter stock, having normally outer and inner parallel ends 5,6, respectively, and parallel trailing and leading sides 8,7, respectively. Extending between said sides 7,8 in axially parallel relationship to ends 5,6 is a series of spaced apart rods 9, made of relatively fine rod stock which coact to define a grill 10 for direct support of an article or articles of food, such as steaks, ribs, fowl, and the like, or for vessels containing food for cooking. The fineness of rods 9, with their mutual spacing, permits of maximum heat flow through grill 10 to the supported article, while conducting to minimal heat absorption by said rods 9. Rods 9 may be secured in any well known manner to frame sides 7,8, as by tack welding. Extending between rack ends 5,6 substantially intermediate their length, in perpendicular relationship thereto, and being rigid at its ends therewith, is a brace element 11 underlying rods 9 for reinforcing same against deformation under the applied load.

Presented beneath each frame end 5,6 is a substantially coextensive, axially parallel runner or skid 12,13, respectively; each having upwardly turned arms 14,15 at their opposite ends for affixation, as by welding, with the overlying portion of frame 4. Said runner arms 14,15 are of predetermined height so that the distance between the grill 10 and the floor (not shown) of oven B will permit of maximum heat transfer for effective cooking, yet prevent direct contact of the food or the vessel containing same with the said oven floor. Thus, rack A upon travel of chain $c$ will, by virtue of runners 12,13 be slidingly moved along deck $d$ and the floor of oven B. Runners 12,13 are preferably circular in cross-section, as being formed of rod stock, to present minimal resistance to sliding movement and with the juncture of the same and the related arms 14,15 being arcuated at $a$ to conduce to overcoming any resistance interposed by obstruction or unevenness in the surface being traversed. The length of arms 14,15 is such as to present grill 10 elevatedly above the heat source provided in the oven floor so as to prevent contact of the article being cooked with the heat source, obviating undesired burning. Also, the elevation provided by the arms 14,15 permits drippings from the article being cooked to descent onto the heat source permitting of minimal flaming. Smoke resulting from the drippings contacting the heat source will tend to envelop the article being cooked and thereby enhance the resultant flavor by providing a smoked character. Furthermore, the height of arms 14,15 will permit of ash accumulation upon the heat source resulting from the drippings and yet maintain the article being cooked against contact therewith.

Projecting endwise from rack inner end 6, in the central portion thereof, is an extension 16, also desirably fabricated of rod stock; said extension 16 being rigid, as by welding; at its proximate end to frame 4, and at its other end portion being formed to provide a depending finger or pin 17 which is free at its lower end. Finger 16 is receivable within a socket 18 in alternating chain links 3 for engaging oven rack A to chain $c$ for towing or conveying thereby. Rearwardly of extension 16, that is, as considered by the direction of travel indicated by the arrow in FIG. 1, and extending endwise from inner end 6, is a guide member 19 which may also be made of rod stock and constituted of a central rail portion 20 axially parallel to the adjacent end 6 and maintained spacedly therefrom by arms 21,22 which at their opposite or remote ends are rigid with frame 4. Thus, guide 19 serves as a detent for abutting against the proximate link 3 of chain c to substantially inhibit rearward swinging of oven rack A about finger 17 as a pivot axis, for thereby maintaining rack A in such relationship to chain c that its transverse axis is perpendicular to the engaged chain link. Thus, this relationship assures that rack A will enter oven B with its leading edge 7 normal to the direction of travel so that the article of food is introduced to the heat to assure of constant and even cooking of all portions thereof. Thus, for example, with a half chicken placed adjacent the leading edge the entire half will enter and leave the oven simultaneously. From a review of FIG. 1 it is evident that guide member 19 restrains rack A throughout its travel along deck d and oven B against inadvertent jamming with chain c with untoward disruption of the desired smooth continuity of movement, as well as, possibly, interferring with the predetermined timing for desired cooking results.

From the foregoing it will thus be apparent that rack A is uniquely constructed for facile engagement with, and disengagement from, chain c, so that the services of skilled personnel are not required. Said rack A, due to the fineness of rods 9, and the spacing therebetween, allows maximum heat from the oven floor to penetrate the supported article of food or to effect transfer through the base of any vessel carried on support 10. Rack A has proven to be especially effective with barbecuing, baking and cooking.

Having described my invention, what I claim and desire to obtain by Letters Patent is:

1. For use with a tunnel type oven having an endless conveyor chain adapted for movement therethrough and with the courses of the latter being disposed in a horizontal plane, an oven rack comprising a frame, means provided on said frame defining a support for matter to be subjected to the oven, said frame having opposed or chain-adjacent and outer or chain-remote ends and opposed leading and trailing sides, an extension projecting from said frame's inner end, a finger depending from the outer end of said extension for detachably engaging said chain, guide means provided on said frame inner end forwardly of said extension for abuttingly engaging said chain to inhibit forward swinging of said rack during conveyance by said chain, and support surface engaging components secured to said frame and being located downwardly thereof.

2. An oven rack as defined in claim 1 and further characterized by said support surface engaging components being a pair of parallel, laterally spaced apart elongated fixed runners for sliding movement over the support surface and means rigidly supporting said runners in underlying spaced relationship to said frame.

3. An oven rack as defined in claim 2 and further characterized by said extension being located substantially intermediate the length of said inner side and said guide means comprising a rail element, means securing said rail element fixedly upon said frame inner end between said extension and said leading edge, said rail element being axially parallel with said frame inner end.

4. The combination with an endless conveyor having its courses disposed in a horizontal plane and being comprised of a multiplicity of articulated links, selected links having a vertical open-tops socket, an oven rack comprising a frame means provided on said frame defining a support for matter to be subjected to the oven said frame having opposed inner or chain-adjacent and outer or chain-remote ends and opposed leading and trailing sides, an extension projecting endwise in the direction of said chain from said frame inner end, and a finger depending from the outer end portion of said extension and being dimensioned for reception within the sockets of the links of said chain for effecting ready detachable engagement of said rack with said chain, said rack further having guide means provided on the frame inner end for abuttingly engaging the proximate link of said chain to inhibit forward swinging of said rack during conveyance by said chain, said guide means being located between said frame extension and said frame leading side.

* * * * *